(12) United States Patent
Zolkover et al.

(10) Patent No.: US 12,047,284 B2
(45) Date of Patent: Jul. 23, 2024

(54) SYSTEM AND A METHOD FOR USING A NETWORK CLOUD SOFTWARE

(71) Applicant: DRIVENETS LTD., Raanana (IL)

(72) Inventors: Gal Zolkover, Haifa (IL); Amir Krayden, Hertzelia (IL); Evgeny Sandler, Herzliya (IL); Yuval Moshe, Ra'anana (IL); Chen Goldenberg, Ramat Hasharon (IL); Ido Susan, Sde Warburg (IL)

(73) Assignee: DRIVENETS LTD., Raanana (IL)

( * ) Notice: Subject to any disclaimer, the term of this patent is extended or adjusted under 35 U.S.C. 154(b) by 25 days.

(21) Appl. No.: 17/271,694

(22) PCT Filed: Aug. 26, 2019

(86) PCT No.: PCT/IL2019/050955
§ 371 (c)(1),
(2) Date: Feb. 26, 2021

(87) PCT Pub. No.: WO2020/044334
PCT Pub. Date: Mar. 5, 2020

(65) Prior Publication Data
US 2021/0194803 A1    Jun. 24, 2021

Related U.S. Application Data

(60) Provisional application No. 62/723,036, filed on Aug. 27, 2018.

(51) Int. Cl.
*G06F 15/173* (2006.01)
*H04L 41/046* (2022.01)
(Continued)

(52) U.S. Cl.
CPC ............ *H04L 45/42* (2013.01); *H04L 41/046* (2013.01); *H04L 45/302* (2013.01); *H04L 45/54* (2013.01); *H04L 45/586* (2013.01)

(58) Field of Classification Search
CPC . H04L 45/00; H04L 63/0272; H04L 63/0218; H04L 41/0866; H04L 45/42;
(Continued)

(56) References Cited

U.S. PATENT DOCUMENTS 7,848,337 B1 * 12/2010 Weng ..................... H04L 45/00
709/224
9,356,866 B1 * 5/2016 Sivaramakrishnan ......................
H04L 45/586
(Continued)

FOREIGN PATENT DOCUMENTS

| EP | 3410652 A1 * | 12/2018 | ......... H04L 12/4641 |
| WO | WO-2016085751 A1 * | 6/2016 | ............. H04L 45/02 |
| WO | WO-2017172218 A1 * | 10/2017 | ......... H04L 12/4641 |

OTHER PUBLICATIONS

Scalability testing of legacy MPLS-based Virtual Private Networks. Gustavo López; Eduardo Grampín 2017 IEEE URUCON Year: 2017 | Conference Paper | Publisher: IEEE (Year: 2017).*
(Continued)

*Primary Examiner* — Yves Dalencourt
(74) *Attorney, Agent, or Firm* — Browdy and Neimark, PLLC (57) ABSTRACT

A network cloud software is provided which is configured to enable operation of multiple hardware network elements as a single routing or switching entity. The network cloud software is used in a distributed manner and provides layers of synchronization and management to allow creation of a network cloud cluster that can start with a single white-box that acts as a stand-alone network device and then scale it to a cluster of tens of hardware elements that would still appear to the external user as a single entity. The network cloud software may also implement mediation layer (HAL) that allows the use of a multi-vendor hardware types by the same network cloud software that is capable of running on a
(Continued)

number of different hardware types, while to the external user they will all be seen as devices that have the same functionality and the same network behavior.

13 Claims, 3 Drawing Sheets

(51) Int. Cl.
*H04L 45/00* (2022.01)
*H04L 45/302* (2022.01)
*H04L 45/42* (2022.01)
*H04L 45/586* (2022.01)

(58) Field of Classification Search
CPC ..... H04L 41/046; H04L 45/302; H04L 45/54; H04L 45/586
USPC .......................................................... 709/238
See application file for complete search history.

(56) References Cited

U.S. PATENT DOCUMENTS

| | | | | |
|---|---|---|---|---|
| 2003/0223406 | A1* | 12/2003 | Balay | H04L 45/50 370/352 |
| 2006/0098607 | A1 | 5/2006 | Zeng et al. | |
| 2006/0250959 | A1* | 11/2006 | Porat | H04L 47/70 370/351 |
| 2011/0314467 | A1* | 12/2011 | Pearson | G06F 9/45504 718/1 |
| 2012/0155461 | A1* | 6/2012 | Kim | H04L 45/42 370/389 |
| 2013/0125120 | A1 | 5/2013 | Zhang et al. | |
| 2013/0185432 | A1 | 7/2013 | So et al. | |
| 2013/0238774 | A1 | 9/2013 | Davison et al. | |
| 2015/0098475 | A1* | 4/2015 | Jayanarayana | H04L 45/64 370/400 |
| 2015/0207676 | A1* | 7/2015 | Kuokkanen | H04L 41/0803 709/220 |
| 2015/0381472 | A1* | 12/2015 | Chippa | H04L 45/64 709/220 |
| 2016/0050125 | A1* | 2/2016 | Mattson | H04L 41/5051 709/225 |
| 2016/0218918 | A1* | 7/2016 | Chu | H04L 41/5054 |
| 2016/0352577 | A1 | 12/2016 | Schiff et al. | |
| 2017/0034051 | A1 | 2/2017 | Chanda et al. | |
| 2017/0070425 | A1 | 3/2017 | Mithyantha | |
| 2019/0349287 | A1* | 11/2019 | Chandra Sekar Rao | G06N 3/044 |
| 2020/0007405 | A1* | 1/2020 | Chitalia | G06F 9/5072 |

OTHER PUBLICATIONS

A methodology for virtual path and virtual network bandwidth assignment in broadband networks with QOS guarantees J.M. Hyman; A.A. Lazar; G. Pacifici Proceedings of ICC/SUPERCOMM'94-1994 International Conference on Communications Year: 1994 | Conference Paper | Publisher: IEEE (Year: 1994).*

Remote Management of Non-TR-069 UPnP End-User Devices in a Private Network B. A. G. Hillen; I. Passchier; B. H. A. van Schoonhoven; F. T. H. den Hartog 2009 6th IEEE Consumer Communications and Networking Conference Year: 2009 | Conference Paper | Publisher: IEEE (Year: 2009).*

The dynamic placement of virtual network functions Stuart Clayman • Elisa Maini • Alex Galis • Antonio Manzalini • Nicola Mazzocca Electronic Publication Date: Jun. 17, 2014 IEEE Conference Paper (Year: 2014).*

Choi, T. et al., "Autonomic management framework for cloud-based virtual networks", 2011 13th Asia Pacific Network Operations and Management Symposium, pp. 1-7. IEEE, (Sep. 21, 2011).

SDN architecture ONF TR-502, Issue 1. Retrieved from the Internet:<www.opennetworking.org/wpcontent/uploads/2013/02/TR_SDN_ARCH_1.0_06062014.pdf> Open Networking Foundation Jun. 30, 2014 (Jun. 30, 2014) Section 4.5; 4.6.

* cited by examiner

SYSTEM AND A METHOD FOR USING A NETWORK CLOUD SOFTWARE

TECHNICAL FIELD

The present disclosure relates generally to the field of networking, and in particular, to a networking software that acts as a network operating system, referred to as "NOS".

GLOSSARY

ACL—Access Control List.
BGP—Border Gateway Protocol.
BOM—Bill of Materials.
CLI—Command Line interface.
CNF—Network Cloud Fabric.
CPU—central processing unit.
DRAM—Dynamic Random-Access Memory.
FIB—forwarding information base table.
GUI—Graphical User Interface.
L2VPN—Layer 2 Virtual Privat Network.
L3VPN—Layer 3 Virtual Private Network.
LIF—logical interface.
NCC—Network Cloud Controller.
NCF—Network Cloud Fabric.
NCM—Network Cloud Management.
NCP—Network Cloud Packet Forwarder.
NOS—Network Operating System.
ODM—Original Design Manufacturer.
RIB—routing information base table.
RU—Rack Unit.
SDK—Software Development Kit.
SRAM—Static Random-Access Memory.
TCAM—Ternary Content-addressable memory.
VLAN—Virtual Local Access Network.
VRF—virtual routing and forwarding.

BACKGROUND

Nowadays, network operators face financial difficulties as the network elements' prices are relatively high per device and consequently the price on a "per port" basis is high, whereas the income per subscriber remains mostly constant and, in some cases, even declines. Obviously, this affects the profitability of the network owners and encourages them to look for ways to implement solutions for cost reduction.

Many network operators and large network owners, such as web-scale owners, adopted the approach of implementing white-boxes, where a white-box is a hardware element that is manufactured from a silicon merchant (commodity chipsets) at ODMs. This approach allowed the network owners to reduce the hardware price to a model of BOM cost plus an agreed-upon margin. Yet, this approach is rather different from the traditional approach, whereby network elements were purchased as a monolithic device of hardware and software combined together. As was mentioned above, the hardware part of the problem (i.e. the hardware part of the network elements) was solved by adopting the white-box approach, still, the adoption of this approach, created new challenges for the software part of the problem.

Network owners would like to have as little network operating systems (NOSs) as possible in their network for reducing Opex, as the higher the number of NOSs is, the more experts are required for each NOS, and a higher number of NOSs leads to a higher management complexity. However, as will be appreciated by those skilled in the art, when implementing the white-box approach, there are likely to be a plurality of different hardware types installed in the network, in which case the software should mediate between the hardware and the human operators to reflect a unity as far as the NOSs are concerned.

Each silicon vendor implements the networking features differently at the chip level and reveals these features via its own SDK. Another challenge involves implementing the same network feature on different hardware types while still maintaining the same user interface, either a CLI or a GUI.

Most white-boxes are designed as a single unit and relatively small form factor that varies from a single RU to few units thereof. This leads to a high port density and scaling problems for most big network operators and datacenters' network owners, who expect network elements having over 1K ports, while the white-boxes usually provide few tens of ports per element. The main challenge in this case is how to provide a software that clusters few hardware elements together in order to increase the port density, while eliminating the complexity in the internal management. The present invention seeks to address these challenges.

SUMMARY

The disclosure may be summarized by referring to the appended claims.

It is an object of the present disclosure to provide a system and a software application that enable various types of devices to operate as a single device having a network functionality of a layer 2 or a layer 3, where the terms "layer 2" and "layer 3" refer to the Open Systems Interconnection model (OSI model).

It is another object of the disclosure to provide a system and a software application for operating and managing a cluster of devices as if they were a single network element.

It is still another object of the disclosure to provide a system in which a plurality of distributed NCPs (network cloud packet forwarders) elements are provided with routing planes of routing entities, and wherein these NCPs are represented at the network level as being a single element, for example as a single element associated with a single BGP (or any other routing/management protocol) session.

Other objects of the present disclosure will become apparent from the following description.

According to a first embodiment of the present disclosure, there is provided a method for operating a plurality of physical (i.e. non-transitory) network elements as a single virtual routing entity, wherein the single virtual routing entity is characterized in that:

a) operation of each of the plurality of physical network elements is synchronized with operation of at least one other of the physical network elements to ensure that:
  i) their control and/or management and/or data planes match the requirements set for their operation as part of the single virtual network element;
  ii) they (i.e. these at least two physical network elements) utilize the same (share) tables for retrieving routing information and forwarding information; and
b) they (i.e. these at least two physical network elements) share at least one member of a group that consists of:
  (i) one or more forwarding information base table (FIB);
  (ii) one or more routing information base table (RIB);
  (iii) one or more quality of service (QoS) queue;
  (iv) one or more configuration engine;
  (v) one or more statistics engine; and
  (vi) one or more fault detection engine.

The term "routing entity" as used herein throughout the specification and claims is used to denote a networking entity that forwards data packets within/between computer/communication networks, either while implementing a routing functionality or while implementing a switching functionality. When acting as a routing entity, it performs traffic directing functions of data packets along the Internet, from one routing entity to another, until the data packets reach their respective final destinations. When acting as a switching entity, it functions by directing data towards a particular hardware destination.

The terms "physical network element" or "physical network node" or "hardware network element" as the case may be, are used interchangeably herein throughout the specification and claims to denote a physical entity such as a packet processor, a CPU, a memory means, a network interface, and the like, that may act as either a single entity or as multiple entities, while operating as part of the virtual routing entity and supporting the routing functionality of the latter.

In accordance with another embodiment, the single virtual routing entity comprises a managing entity that is configured to interconnect physical network elements associated with the virtual routing entity and to manage their respective operations, thereby providing a routing functionality to that single virtual routing entity.

According to another embodiment, each of the physical network elements is adapted to carry out software driven processes, wherein the software driven processes are executed in software containers each associated with a respective physical network element, and the method further comprising synchronizing the software driven processes carried out by the plurality of physical network elements.

In a case where the virtual routing entity is operative as an NCP (a Network Cloud Packet Forwarder) or as an NCF (a Network Cloud Fabric), each software container is separated from other software containers that are used to run software processes associated with any of the other physical network elements belonging to that virtual routing entity.

The term "software container" as used herein throughout the specification and claims, is used to denote a software packaged into standardized units for development, shipment and deployment. A container is a lightweight, stand-alone, executable package of a piece of the software that includes whatever is required to run that piece of software, such as: code, runtime, system tools, system libraries, settings, etc.

By yet another embodiment, the physical network elements included in the single virtual routing entity are interconnected via a shared routing platform (e.g. by means of "demarcation LIFs", or in other words, having IP addresses that are associated with features characterizing the physical network element, such as a role, a home port, etc. used as demarcation points, with no need to physically interconnect their network interfaces). Such an interconnection may, but not necessarily, be implemented logically, by means of a "demarcation LIF" that imitates an interconnection achieved via network interfaces, wherein that interconnection does not require any physical cabling therebetween.

In accordance with another embodiment, resources associated with each of the plurality of physical network elements, are allocated as shared resources for routing or switching services. In other words, resources of the physical network elements (e.g. TCAM entries, counters, shapers, meters, DRAM/SRAM etc.) are shared in order to allocate resources for routing and/or switching services that need to be carried out by the single virtual routing entity, and optionally in compliance with pre-configured thresholds.

Therefore, sharing resources of the plurality of the physical network elements operating as a single routing or switching entity platform, allows flexible inner resources' management and consequently a better utilization of the existing hardware. A resources' template, may be used to define dedicated resources per each routing or switching service, such as for example L3VPN, L2VPN, QoS queueing and VLAN allocations.

By yet another embodiment, the virtual routing entity maintains a dedicated forwarding plane on one or more of the shared packet processors (when operating as an NCP) of the physical network elements, and/or on one or more fabrics (when operating as an NCF) of the physical network elements.

For implementing this embodiment, the segregation of the forwarding plane may be carried out by implementing a hardware abstraction layer (referred to herein after "HAL"). In other words, the routing or switching entity may maintain forwarding tables and/or switching tables that are either the same at each physical network element, or relevant subsets of forwarding tables and/or switching tables of respective physical network elements.

According to another embodiment, the virtual routing (or switching) entity maintains a dedicated management plane for all of the shared packet processors (NCPs) and/or the CPUs. The management plane is associated with configuration transactions, statistics reporting and fault reporting and is configured to run on a separate dedicated hardware network element, that will be referred hereinafter as an NCM (network cloud management) element. This NCM element functions as an internal entity with respect to the cluster transport plane, and is connected to each NCP (Network Cloud Packet forwarder), to each NCF (Network Cloud Fabric) and to each NCC (Network Cloud Controller), by generating a messaging plane which is not exposed to any entity outside of the cluster of elements included in the virtual routing entity, and the management is affected only between the Network Cloud Cluster elements, the NCPs, NCFs and the NCC.

By yet another embodiment, the single virtual routing entity is configured to be managed by a network cloud controller (NCC) for managing the plurality of physical network elements by maintaining synchronization of routing data, switching data and by configuring each of the plurality of physical network elements in accordance with a software associated therewith. Preferably, the network cloud controller (NCC) is further configured to present interfaces' status to entities that are not included within the single virtual routing entity (i.e. entities which are external to the single virtual routing entity).

In accordance with still another embodiment of the present disclosure, the method provided is further adapted to enable dynamic addition or removal of one or more hardware network elements, to/from the hardware network elements that are already associated with said single virtual routing entity.

These changes are reflected at the virtual routing (or switching) entity implemented at the NCC, preferably by using a management application configured to manage the routing or switching entities comprised in the NCP and NCF software modules. Preferably, once the dynamic addition or removal of a hardware network element is carried out, its respective resources are added/removed respectively, followed by synchronization of all the NCPs and NCFs connected to the relevant cluster by the virtual routing or switching entity implemented at the NCC.

According to another aspect of the disclosure there is provided a non-transitory computer readable medium storing a computer program for performing a set of instructions to be executed by one or more computer processors, the computer program is adapted to perform a method for operating a plurality of physical network elements as a single virtual routing entity, wherein the single virtual routing entity is characterized in that:

a) operation of each of the physical network elements is synchronized with operation of at least one other of the physical network elements to ensure that:

i) their control and/or management and/or data planes match the requirements set for their operation, as part of the single virtual network element;

ii) they (i.e. the at least two physical network elements) utilize the same tables for routing information and for forwarding information; and     b) they (i.e. the at least two physical network elements) share at least one member of a group that consists of:

(i) one or more forwarding information base table (FIB);

(ii) one or more routing information base table (RIB);

(iii) one or more quality of service (QoS) queue;

(iv) one or more configuration engine;

(v) one or more statistics engine; and

(vi) one or more fault detection engine.

By yet another embodiment of this aspect of the disclosure, the method further comprises a step of generating a managing entity configured to interconnect physical network elements belonging to the virtual routing entity and to manage their respective operations.

In accordance with another embodiment of this aspect of the disclosure, the method further comprises a step of allocating shared resources derived from the plurality of physical network elements, for carrying out routing or switching services.

According to still another embodiment of this aspect of the disclosure, the method further comprises a step of generating a dedicated forwarding plane at one or more of the shared packet processors and/or at one or more fabrics of the physical network elements.

In accordance with yet another embodiment of this aspect of the disclosure, the method further comprises a step of generating a dedicated management plane for all of the shared packet processors and/or all of the CPUs associated with the plurality of physical network elements.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Some of the embodiments of the present disclosure relate to a software architecture that comprises two distinct software modules, one being the NCP (network cloud packet forwarder), and the other—NCF (network cloud fabric). Each of these modules is configured to handle a specific set of functions. The NCP is configured to implement traditional functionalities of a data path, by agents that create a mediation layer between the specific hardware used and the respective vendor's SDK and the representation of the various hardware network elements for higher levels (externally), as being the same, irrespective of the hardware actually being used. The NCP functionality includes, among others, FIB (forwarding information base table) programing, ACL (access lists) programing, QoS (quality of service) determination, data path security like RPF (urpf), LLDP (link layer discovery protocol), LACP (links aggregation control protocol). These may be implemented as part of the cluster (virtual entity) management agent, which is configured to connect the NCP to other NCPs and NCFs and to create the network cloud system. Among other functions, the cluster management agent is configured to perform internal system synchronization such as FIB to RIB distribution, transactions received from an end user by utilizing any given protocol (e.g. CLI, SSH, NETCONF, RESTCONF, and the like), statistics collection and reporting to the routing and management element, fault and status reporting to the routing and management element, clock synchronization security and permissions enforcement.

The NCF on the other hand is a software module that would be usually implemented on a hardware that is based on a fabric chipset. This module is responsible for functions such as resources' allocation, multicast packets duplications, reporting fault and status information regarding the fabric current status to the routing and management module, and connecting few NCPs in order to generate a single virtual routing entity out of distributed packet forwarding elements, that in effect creates a very high scale and port density that is not likely to be achieved in other network elements or network devices, unless the solution provided by the present disclosure is adopted. The reason being that such other network elements or network devices having a very high scale and port density, will experience problems such as power, heat dissipation and cooling problems which characterize prior art solutions and approaches.

A typical routing (or switching) platform, comprising one or more routing and/or switching processors (for the sake of redundancy), will be referred to as an NCC (Network Cloud Controller). Forwarding devices (depending on the number of the network interfaces that are present in that routing or switching platform) will be referred to as NCPs (Network Cloud Packet forwarder), while fabric devices, as needed to support the number of ports that are part of the virtual routing entity, will be referred as a network cloud cluster.

The routing and switching processors are elements used for computing, that are configured to run control plane protocols (e.g. routing protocols, Layer 2 of the OSI model protocols and switching) and management plane protocols, referred to herein as routing engines or NCC (network cloud controller). The routing protocols populate routing information base table (RIB) and the Layer 2 protocols populate the switching tables and the mac headers tables. Eventually, a RIB table includes routes to all reachable destinations within the network, and the switching table includes all Layer 2 addresses that have already been learnt.

Forwarding devices, NCPs, are typically based on packet processors which may be a data plane ASIC or FPGA. Packet processors have a number of network interfaces. Each network interface may be additionally segregated into a plurality of logical interfaces (LIFs). LIF may be represented at a network interface as a VLAN, an MPLS LSP, an L3 tunnel, etc. The packet processors are configured to enable packet forwarding from one LIF to another. The forwarding decision is taken by a packet processor according to the forwarding information base table (FIB) and/or the switching table. A FIB table is populated with best routes to the destinations reachable by a router that are available at that RIB table, while Layer 2 traffic is forwarded to the correct LIF based on Layer 2 addresses that were learnt either by exchanging protocol information or by listening to traffic received at a specific LIF. In addition to the FIB tables and switching tables, packet processors NCPs, maintain other resources such as Access Control List (ACL), counters, traffic meters, shapers and the like, so that these resources may be applied while taking a decision on how to forward the received data packets. In addition to a packet processor, a forwarding device may include a CPU that executes a Forwarding Engine application, where such a Forwarding Engine application is responsible to maintain FIB, ACL and other packet processor resources, according to the routing engine (i.e. NCC directives). The Forwarding Engine application, referred to as NCP, reports the status of the forwarding device (such as the network interfaces state, counters, etc.) to the routing engine, NCC, and conveys routing protocol packets as well as Layer 2 protocol packets received by the packet processor, towards a routing engine and/or a switching engine.

The fabric devices are typically based on fabric elements which may be data plane ASIC or FPGA chips. Fabric elements are used for interconnecting forwarding devices in order to enable forwarding a packet from a LIF that resides on one forwarding device to a LIF that resides on another forwarding device. In addition to the fabric element, a fabric device typically includes a CPU that runs the Fabric Engine application, and referred to as NCF (Network Cloud Fabric). Fabric Engine application, NCF, is responsible to report the status of the fabric element (such as the fabric interfaces state, counters, etc.) to the routing engine and switching engine and in cases where packet duplication is needed such as in multicasting cases or port mirroring, the NCF would also be responsible for that functionality.

The platform management entity, NCC (Network Cloud Controller), interconnects all routing processors, forwarding devices and fabrics comprised in the routing platform (the virtual routing entity). The NCC forwards RIB-FIB synchronization flows, and routing protocols packets flows between a data plane and a control plane (referred to as the slow path), Layer 2 protocol packets, as well as managing the platform performance, faults, configuration and maintains packets' flows.

Figure 1:
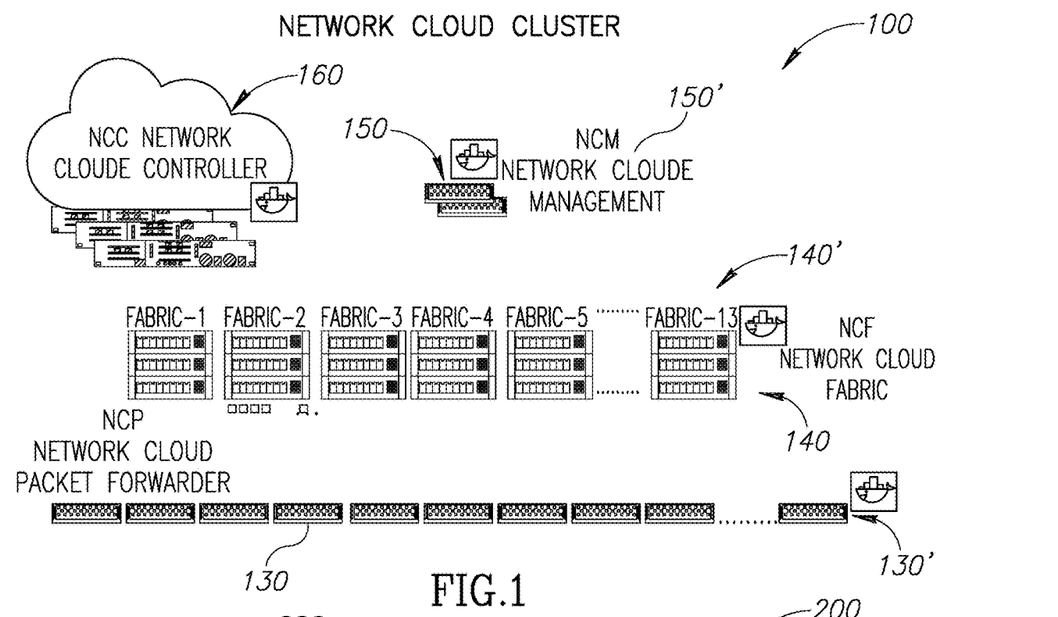
FIG. 1—illustrates physical and logical connectivity between the physical network elements (hardware) and software components that constitute the virtual network routing entity, construed in accordance with an embodiment of the present invention.

FIG. 1. illustrates an example of an embodiment construed in accordance with the present disclosure, of a virtual routing entity 100 which may be considered as a network cloud cluster, comprising multiple hardware packet processing elements 130 and hardware fabric elements 140. A software application 130' is used to run and manage all hardware packet processing elements 130, and a software application 140' is used to run and manage all hardware fabric elements 140. Network cloud manager 150 and the software application associated therewith, are configured to operate and manage software modules of the NCPs 130 and the NCFs 140. The routing engine in this example maintains its own routing protocols as well as its own RIB table, and is configured to execute the respective software in a separate software container. Forwarding devices in the routing platform run forwarding engines, the NCPs 130. Hardware abstraction layer (HAL) (not shown in this figure) on a forwarding device allows to provide support for multi hardware packet processor types, (if purchased for example from different ODMs and/or from different chipset vendors). The fabric device in the network cloud cluster runs the fabric engines, the NCFs. The internal control of the network cloud cluster that includes directives for the NCPs 130 and NCFs 140 statistics collection and reporting, fault reporting and general internal communication, is carried over a path dedicated for that purpose through NCM 150, Network Cloud management switch, and the software application associated therewith, 150', used to connect all the elements that belong to a cluster to the NCC 160, the network cloud controller, that is deployed on a separated x86 server. Obviously, as will be appreciated by those skilled in the art, x86 server is depicted in this figure as an example only, as the NCC 160 of this example may run on any x86 part of any of the hardware network elements.

The network cloud controller NCC, 160, which executes all the routing and switching protocols, carries out the management plan with its transaction-based configuration engine. It acts as the statistics manager and collector, SBI— south bound communication agents towards the NCPs and NCFs and the NBI—north bound interfaces towards other systems or end user like SSH, NETCONF, AAA and others.

Figure 2:
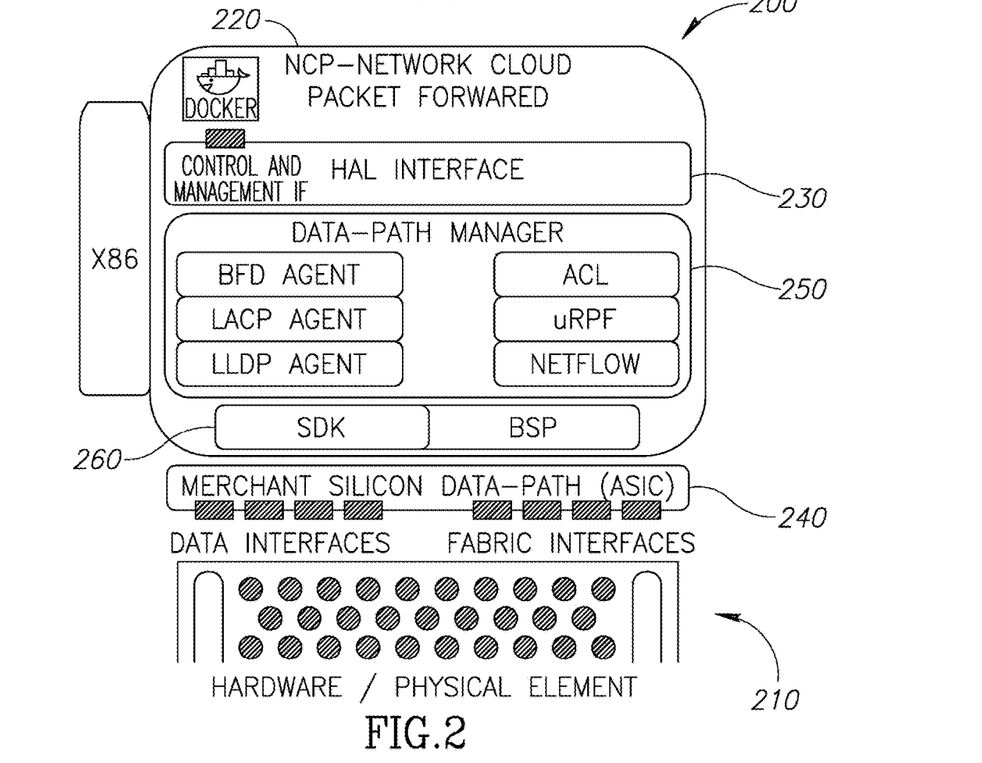
FIG. 2—illustrates NCP—Network cloud packet forwarder software, construed in accordance with an embodiment of the present invention.

FIG. 2. demonstrates a mechanism that supports sharing of data-plane HW resources among physical network elements 210 belonging to a single virtual routing (and switching) entity 200. Forwarding each NCP 220, network cloud packet, is implemented on a respective processing hardware. HAL 230 maintains a mapping table for mapping the RIB to a local FIB and programs the specific vendor's chipset 240 by utilizing a corresponding specific SDK. Since all supported hardware 260 SDKs are implemented in the software module of NCP 220, the appropriate one will be used after the relevant hardware type has been identified and recognized by the software module. NCP 220 also implements data-path functions 250 by agents which are function specific, e.g. an LLDP agent, a BFD agent, an LACP agent, a uRPF agent, an ACL agent, an NETFLOW agent and a QoS agent. Depending on the hardware queues implementation, the NCP may also manage the allocation of queue resources so that the directives arriving from the NCC, are implemented. All agents are connected to the NCC and receive the directives for configuring the data-path as instructed with respect to the relevant chipset and the SDK associated with the specific functionality. NCP 220 may also have an infrastructure agent that controls the white-box peripherals of the hardware network element like LEDs, fans, power supply and other hardware elements that reside on the white-box, via the BSP. The NCP also collects statistics and faults from all relevant hardware network elements, such as physical network ports, physical fabric ports (ports used to connect NCP to NCF for packets transport), CPUs, RAM, fans, power supply, and the like.

Figure 3:
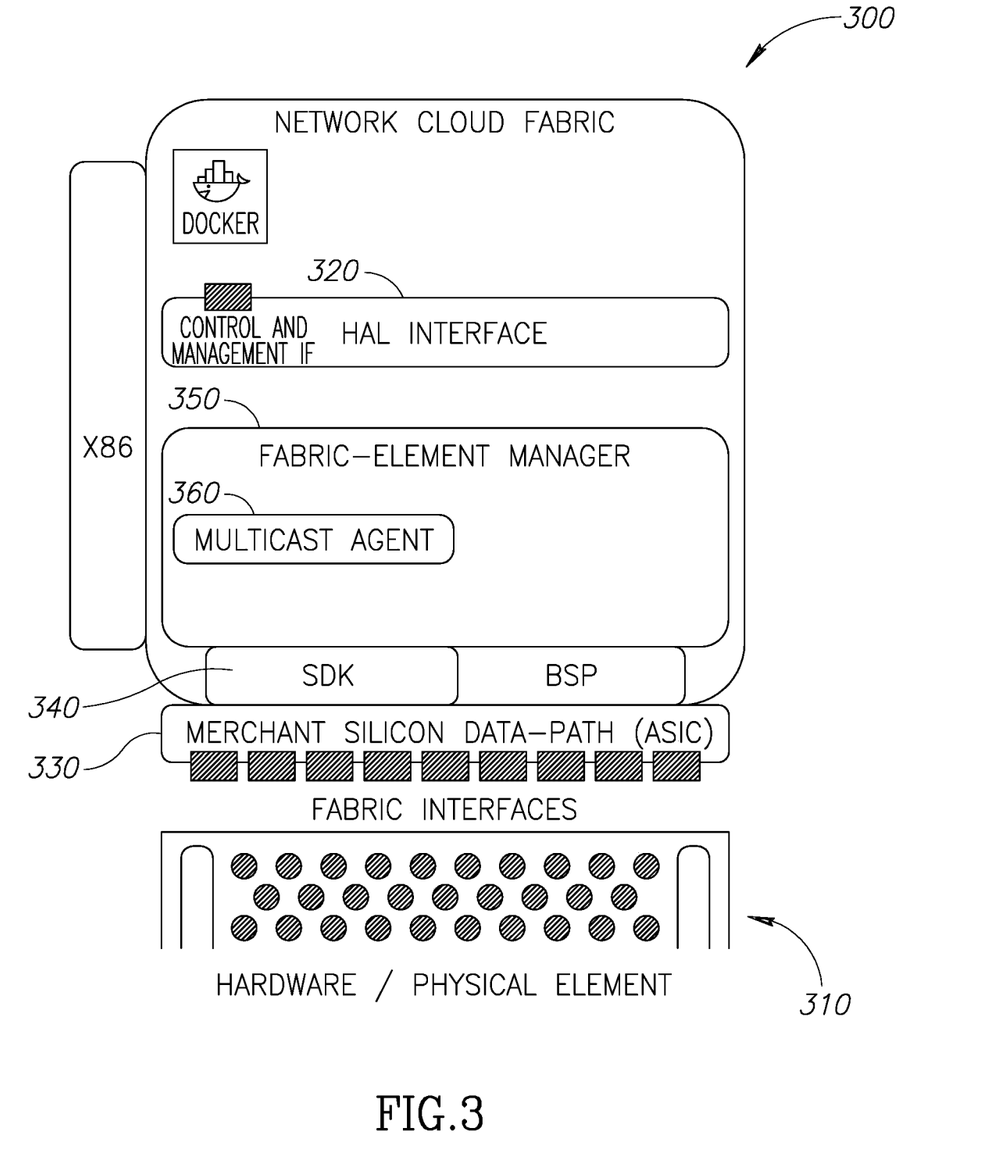
FIG. 3—illustrates NCF—Network cloud Fabric software, construed in accordance with another embodiment of the present invention.

FIG. 3. illustrates a mechanism that supports sharing of fabric elements' resources among physical network elements 310 belonging to a single routing (and switching) entity 300, wherein each NCF network cloud packet fabric is implemented on a respective fabric hardware. HAL 320 maintains a mapping table for mapping the resources (mainly, but not limited to, queues and programs) for each specific vendor's chipset 330 by utilizing a specific SDK 340 that corresponds to that chipset, after identifying the chipset type in order to determine which is the specific SDK that should be used. NCF manager 350 also implements packets' duplication functionality that is mainly used by a multicasting agent 360 for multicasting and port mirroring by a specific agent. In the example illustrated in this FIG. 3, it is referred to as a multicast agent.

Depending on the hardware queues implementation, the NCF may also manage the allocation of queue resources so that the directives arriving from the NCC, are implemented. All agents are connected to the NCC and receive the directives for configuring the fabric element as instructed with respect to the relevant chipset and the SDK associated with the specific functionality. The NCF may also have an infrastructure agent that controls the white-box peripherals of the hardware network element like LEDs, fans, power supply and other hardware elements that reside on the white-box, via the BSP. The NCP also collects statistics and faults from all relevant hardware network elements, such as physical fabric ports, (ports used to connect NCP to NCF for packets' transport), CPUs, RAM, fans, power supply, and the like.

Figure 4:
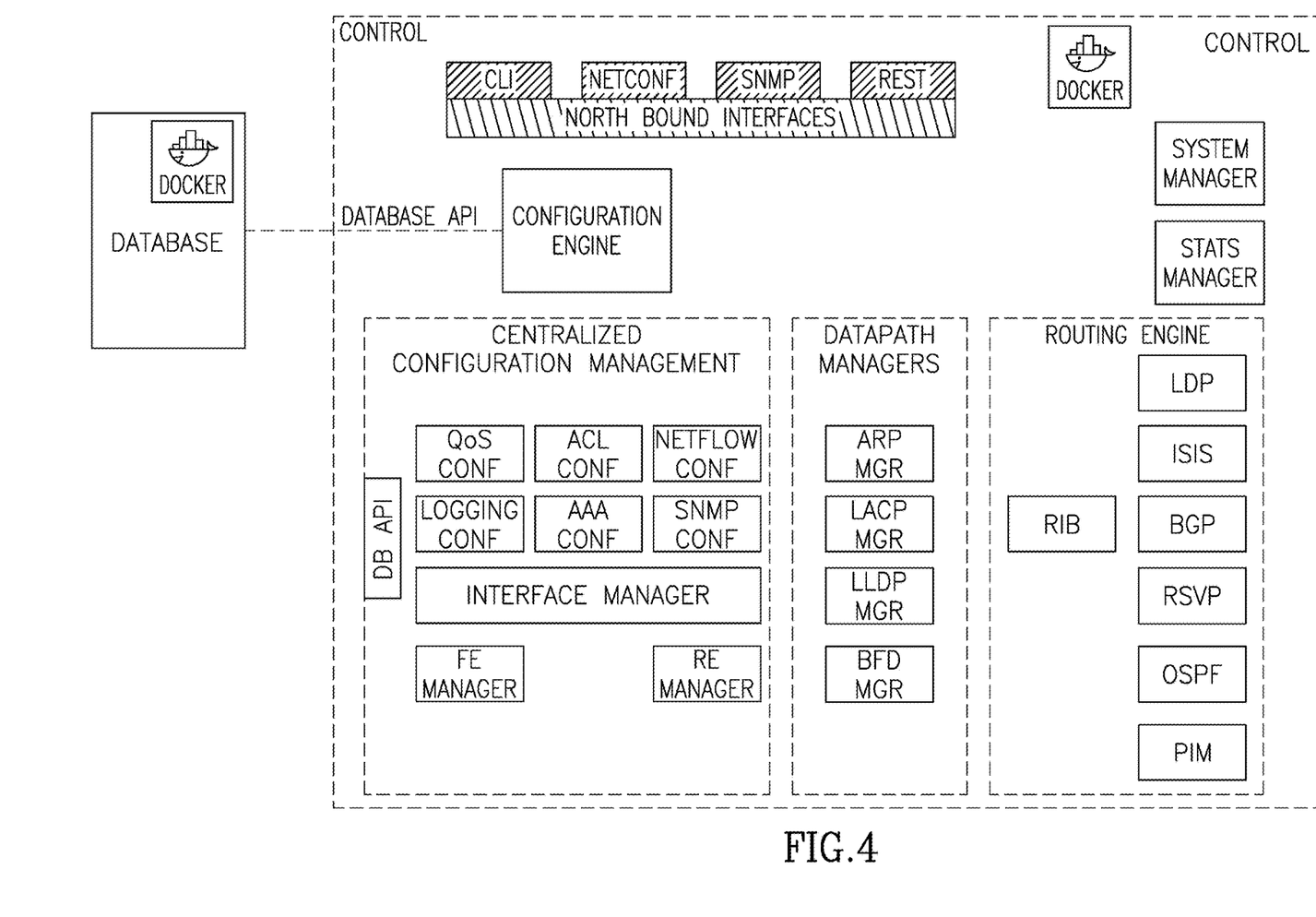
FIG. 4—illustrates a schematic block diagram of a network cloud controller software, construed in accordance with yet another embodiment of the present invention.

FIG. 4. Is a block diagram, exemplifying a mechanism that supports managing, monitoring and configuring of a plurality of hardware elements, that form together a single virtual routing entity (i.e. a single network cloud cluster). The NCC, network cloud controller, is comprised of few sub-modules, where each of these sub-modules is responsible for carrying out a specific functionality associated with the single virtual routing entity. The centralized configuration management is responsible for sending the directives derived from an end user and/or external system to the relevant NCPs and NCFs. Due to the nature of the cluster, a transaction of directives might require the use of more than one hardware and software element, and the centralized configuration management enables using transaction-based configuration for the end user and/or the external systems, by implementing a running configuration vs candidate configuration with a rollback and a differentiation comparison. Before embarking on another task of this module, all elements should preferably be kept synchronized with the latest directives. For example, in case that one or more of the elements fails to be configured, then either a revert or a retry is needed, which will automatically be implemented by this module. The data-path managers implement the higher level and the more centralized management of the functionalities required from the different agents that reside at the NCPs. For example, when a feature involves more than one NCP, such as LACP ports located on separate NCPs.

The routing engine implements all the applicable routing and switching protocols such as BGP, LDP, ISIS, OSPF, PIM, RSVP and the like, as defined in the relevant RFCs relevant Request for Comments ("RFCs") and also implements the consolidation and structuring of the FIB table based on the protocols' directives. The functionality required from the status manager is to collect data concerning all NCPs, NCFs, NCMs statistics and to present a unified representation to external systems and/or to the end user (a network operator).

Let us assume that a logical interface is spread between a number of NCPs and NCFs, so that the data collected by each element, either an NCP or an NCF, should be consolidated prior to presenting that logical interface to the external system of the end user. The system manager may be used as a consolidating module that is used for all the infrastructure agents associated with the NCPs, NCFs and NCMs. This module is responsible to present any fault, if arises at any of the hardware or software modules, and to report them back to the external system or the end user, by any of the available NBIs. Moreover, this module may correlate and broaden the fault reporting, for example when a fabric port fails. Since there might be certain implications to such a fault on numerus services required to be performed by the cluster, such as of a specific logical interface, the system manager may correlate the NCP fabric port with the NCF fabric port and the logical interface effected, and will report a unified fault reason.

A configuration engine may be used for synchronizing the configuration with that of another NCC element for redundancy and high availability purposes. This module functionality may be carried out on a periodic basis, and based on configuration change events, to invoke configuration synchronization transaction with a remote NCC. Configuration in this context refers to a configuration that is derived from an end user and/or from an external system. However, changes of sources in routing protocols are also replicated for the benefit of the remote NCC, to allow a fast switchover between members of a pair of NCC, in case that a failure occurs or if maintenance is scheduled. The north bound interfaces module presents all relevant configuration to the external systems and/or the end user, however all transport protocols such as SSH, NETCONF and preferably presented in a read only mode. For example, when gRPC SNMP protocols are associated with the same data model via a single managed object, that means that all NBIs configure and read the same data, which allows them all to remain synchronized. The write priority between the different NBIs, may be configurable.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising a plurality of physical network elements which are configured to operate as a single virtual routing entity, wherein the single virtual routing entity is characterized in that:
   a) said single virtual routing entity is implemented at a network cloud controller (NCC);
   b) the single virtual routing entity comprises a managing entity configured to interconnect routing processors, forwarding devices and fabrics comprised in the physical network elements belonging to said single virtual routing entity and to manage their respective operations, thereby providing a routing functionality to that single virtual routing entity;

c) said managing entity is configured to synchronize said physical network elements' operation, by maintaining synchronization of routing data and switching data and by configuring each of the plurality of physical network elements in accordance with a software associated therewith, and once a dynamic addition or removal of a physical network element is carried out, its respective resources are added/removed respectively by said managing entity for operating network elements associated with the single virtual entity, followed by synchronization of all relevant network elements by the virtual routing entity implemented at the NCC, wherein said managing entity is configured to:
  i) confirm that control and management and data planes associated with each of said plurality of physical network elements, match current requirements set for the operation of each of said plurality of physical network elements, as part of the current operation of said single virtual routing entity;
  ii) confirm that said plurality of physical network elements utilize same tables for routing information and for forwarding information; and
d) said plurality of physical network elements share with other physical network elements of said single virtual routing entity at least one member of a group that consists of:
  (i) one or more forwarding information base table (FIB);
  (ii) one or more routing information base table (RIB);
  (iii) one or more quality of service (QOS) queue;
  (iv) one or more configuration engine;
  (v) one or more statistics engine; and
  (vi) one or more fault detection engine.

2. The system of claim 1, wherein each of the physical network elements is adapted to carry out software driven processes, wherein the software driven processes are executed in a software container associated with a respective physical network element, and the method further comprising synchronizing said software driven processes.

3. The system of claim 1, wherein resources associated with each of the plurality of physical network elements, are allocated as shared resources for routing or switching services.

4. The system of claim 3, wherein the virtual routing entity is configured to maintain a dedicated forwarding plane on one or more of the shared packet processors and/or on one or more fabrics, of the physical network elements.

5. The system of claim 3, wherein the virtual routing entity is configured to maintain a dedicated management plane for all of the shared packet processors and/or all of the Central Processing Units, CPUs.

6. The system of claim 1, wherein said network cloud controller (NCC) is configured to present interfaces' status to entities that are not included within said single virtual routing entity.

7. The system of claim 1, further configured to enable dynamic addition or removal of one or more hardware network elements, to/from hardware network elements that are already associated with said single virtual routing entity.

8. The system of claim 1, wherein said single virtual routing entity further comprising a hardware abstraction layer (HAL) for allowing a use of at least two different types of hardware devices with said single virtual routing entity.

9. A non-transitory computer readable medium storing a computer program for performing a set of instructions to be executed by one or more computer processors, the computer program is adapted to perform a method for operating a plurality of physical network elements as a single virtual routing entity implemented at a network cloud controller (NCC), wherein said method comprising:
  a) interconnecting routing processors, forwarding devices and fabrics comprised in the physical network elements belonging to said single virtual routing entity and managing their respective operations, by a managing entity comprised in said single virtual routing entity, thereby providing a routing functionality to that single virtual routing entity;
  b) synchronizing operation of said physical network elements by said managing entity, by maintaining synchronization of routing data and switching data and by configuring each of the plurality of physical network elements in accordance with a software associated therewith, and once a dynamic addition or removal of a physical network element is carried out, its respective resources are added/removed respectively by said managing entity for operating network elements associated with the single virtual entity, followed by synchronization of all relevant network elements by the virtual routing entity implemented at the NCC, wherein said synchronizing step is adapted to:
    i) confirm that control and management and data planes associated with each of said plurality of physical network elements, match current requirements set for the operation of each of said plurality of physical network elements, as part of the current operation of said single virtual routing entity;
    ii) confirm that said plurality of physical network elements utilize same tables for routing information and for forwarding information; and
  c) operating said physical network elements by said single virtual routing entity and confirming that said physical network elements share with other physical network elements of said single virtual routing entity at least one member of a group that consists of:
    (i) one or more forwarding information base table (FIB);
    (ii) one or more routing information base table (RIB);
    (iii) one or more quality of service (QOS) queue;
    (iv) one or more configuration engine;
    (v) one or more statistics engine; and
    (vi) one or more fault detection engine.

10. The non-transitory computer readable medium of claim 9, wherein said method further comprising a step of allocating shared resources derived from the plurality of physical network elements, to routing or switching services in accordance with network needs.

11. The non-transitory computer readable medium of claim 10, wherein said method further comprises generating a dedicated forwarding plane at one or more of the shared packet processors and/or at one or more fabrics, of the physical network elements.

12. The non-transitory computer readable medium of claim 10, wherein said method further comprises generating a dedicated management plane for all of the shared packet processors and/or all of the CPUs associated with the plurality of physical network elements.

13. A system comprising a plurality of physical network elements which are configured to operate as a single virtual routing entity, wherein the single virtual routing entity is characterized in that:
  a) operation of each of said physical network elements is synchronized with operation of at least one other of the plurality of physical network elements by maintaining synchronization of routing data and switching data therebetween, and once a dynamic addition or removal of a physical network element is carried out, its respective resources are added/removed respectively by said managing entity for operating network elements associated with the single virtual entity, followed by synchronization of all relevant network elements by the virtual routing entity implemented at the NCC, and confirming that:
  i) control and management and data planes associated with each of said plurality of physical network elements, match the current requirements set for the operation of each of said plurality of physical network elements, as part of the current operation of said single virtual routing entity;
  ii) said plurality of physical network elements utilize same tables for routing information and for forwarding information; and
b) the plurality of physical network elements share with other physical network elements of said single virtual routing entity at least one member of a group that consists of:
  (i) one or more forwarding information base table (FIB);
  (ii) one or more routing information base table (RIB);
  (iii) one or more quality of service (QOS) queue;
  (iv) one or more configuration engine;
  (v) one or more statistics engine; and
  (vi) one or more fault detection engine.

\* \* \* \* \*